US012601442B1

(12) United States Patent
Hardin et al.

(10) Patent No.: US 12,601,442 B1
(45) Date of Patent: Apr. 14, 2026

(54) INTERNAL PIPE FLOAT DEVICE

(71) Applicants: Wise Jackson Hardin, Altamonte Springs, FL (US); John Paul Hardin, Fairview, NC (US)

(72) Inventors: Wise Jackson Hardin, Altamonte Springs, FL (US); John Paul Hardin, Fairview, NC (US)

( * ) Notice: Subject to any disclaimer, the term of this patent is extended or adjusted under 35 U.S.C. 154(b) by 0 days.

(21) Appl. No.: 19/249,367

(22) Filed: Jun. 25, 2025

(51) Int. Cl.
F16L 55/38 (2006.01)

(52) U.S. Cl.
CPC .................................... F16L 55/38 (2013.01)

(58) Field of Classification Search
CPC ............ F16L 55/38; F16L 55/30; F16L 55/28
See application file for complete search history.

(56) References Cited

U.S. PATENT DOCUMENTS

| | | | | |
|---|---|---|---|---|
| 3,649,983 A | * | 3/1972 | Ver Nooy | B08B 9/0554 |
| | | | | 15/104.061 |
| 4,624,313 A | * | 11/1986 | Coshow | E21B 17/1057 |
| | | | | 166/241.5 |
| 2018/0058179 A1 | * | 3/2018 | Nuryaningsih | E21B 41/00 |

FOREIGN PATENT DOCUMENTS

KR    20140093046 A    *    7/2014    ............... F16L 1/11

OTHER PUBLICATIONS

English Machine Translation of Chung et al. (KR 20140093046 A) (Year: 2014).*

* cited by examiner

*Primary Examiner* — David Z Huang
(74) *Attorney, Agent, or Firm* — Jason T. Daniel, Esq.; Daniel Law Offices, P.A.

(57) ABSTRACT

An internal pipe float device includes a main body having a top surface, a bottom surface, a side surface and an interior space. The main body is constructed from a lightweight buoyant material and the interior space includes a sealed air pocket that increases the buoyancy of the body. The main body includes a generally circular shaped member having a plurality of notches along the side surface. Each of the notches houses a wheel assembly having an axle and wheel. The main body has an outside diameter that closely approximates the inside diameter of a pipe that is filled with a liquid. The device automatically floats from one end of the pipe to the other end of the pipe as one end is positioned above or below the other end.

10 Claims, 6 Drawing Sheets

INTERNAL PIPE FLOAT DEVICE

TECHNICAL FIELD

The present invention relates generally to flotation objects, and more particularly to a float device for use within a water pipe.

BACKGROUND

The statements in this section merely provide background information related to the present disclosure and may not constitute prior art.

There are many known types of buoyant devices capable of floating within a liquid. The present invention, directed to an internal pipe floating device differs from the conventional art in a number of aspects. The manner by which will become more apparent in the description which follows, particularly when read in conjunction with the accompanying drawings.

SUMMARY OF THE INVENTION

The present invention is directed to an internal pipe float device. One embodiment of the present invention can include a main body having a top surface, a bottom surface, a side surface and an interior space. The main body can be constructed from a lightweight buoyant material such as plastic and the interior space can include a sealed air pocket for increasing the buoyancy of the body.

In one embodiment, the main body can include a generally circular or puck shaped member and can include a plurality of notches along the side surface. Each of the notches can receive a wheel assembly having an axle and wheel. The axle can be positioned serially with the side surface and the wheel can be positioned perpendicular with the side surface so as to aid the device in moving.

In one embodiment, the main body can include an outside diameter that is slightly less than the inside diameter of a pipe that is filled with a liquid. The device can engage a guide wire located within the pipe and can automatically float from one end of the pipe to the other end of the pipe as one end is positioned above or below the other end.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
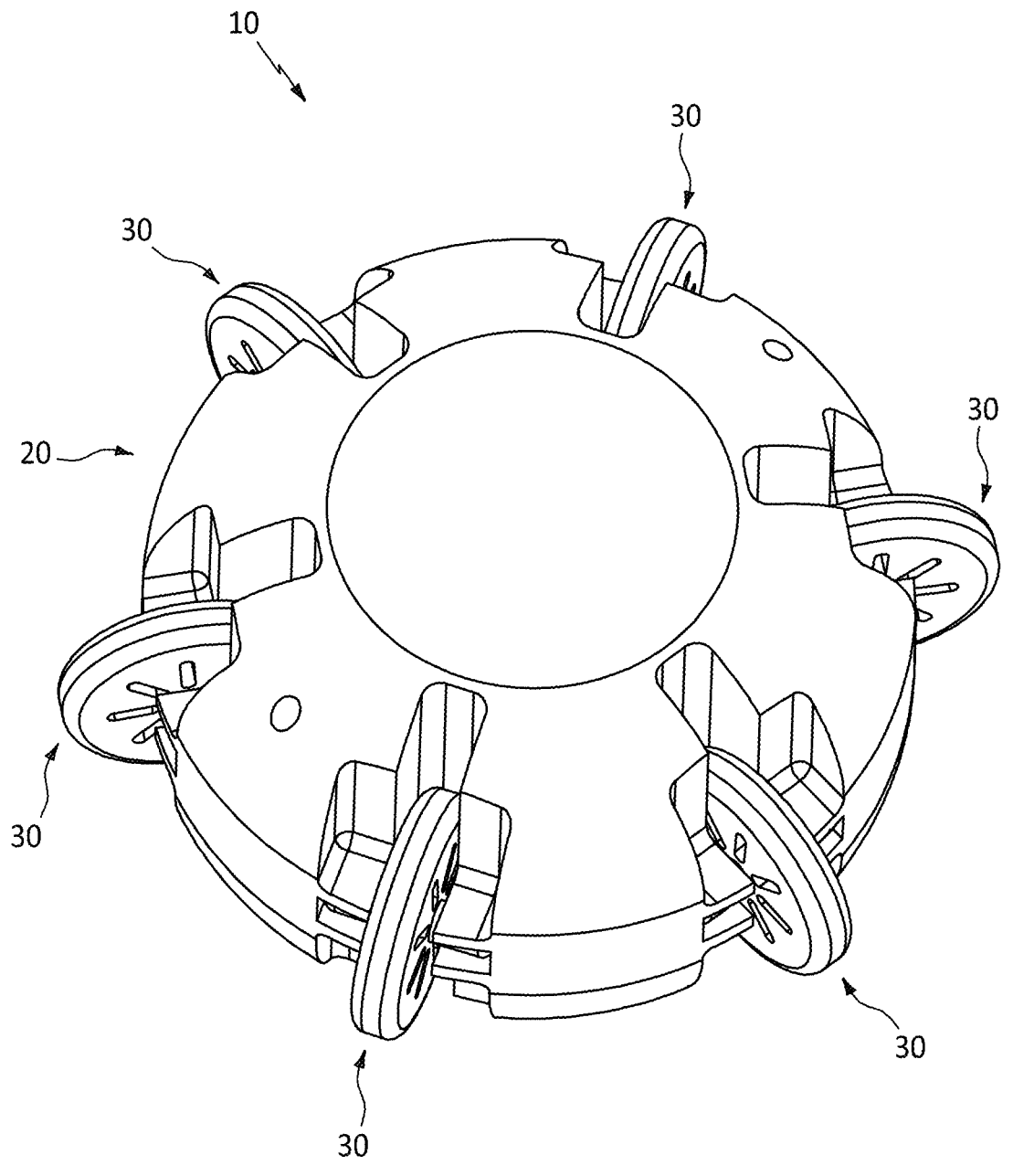
FIG. 1 is a perspective view of an internal pipe float device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described throughout this document, the term "removably secured" and derivatives thereof shall be used to describe a situation wherein two or more objects are joined together in a non-permanent manner so as to allow the same objects to be repeatedly joined and separated. This can be accomplished through the use of any number of different "connectors".

Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles, clamps, sockets, clips, and compression fittings, among others, for example.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-5 illustrate one embodiment of an internal pipe float device 10 that is useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 2A:
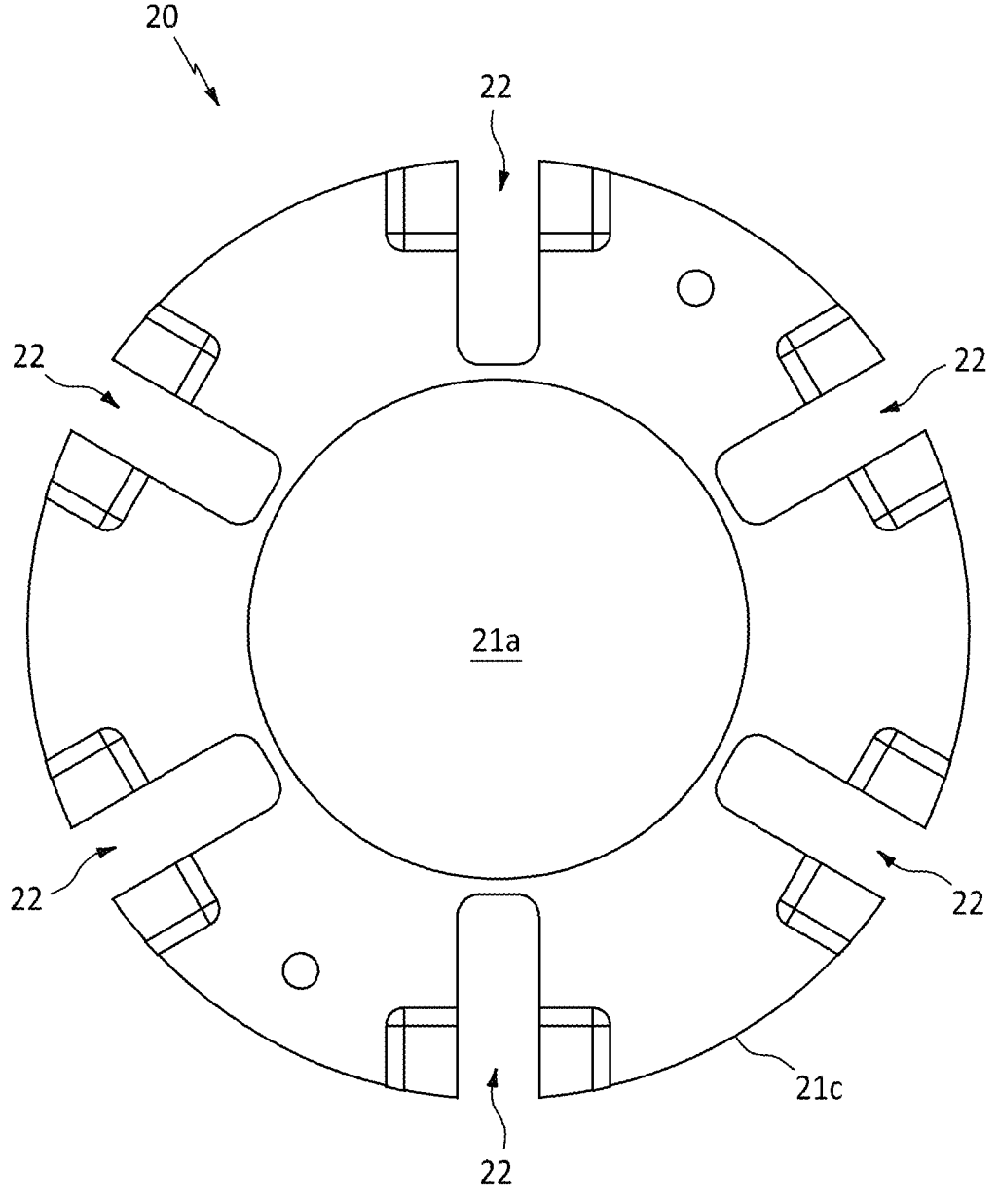
FIG. 2A is a top view of the main body of the pipe float device, in accordance with one embodiment of the invention.
Figure 2B:
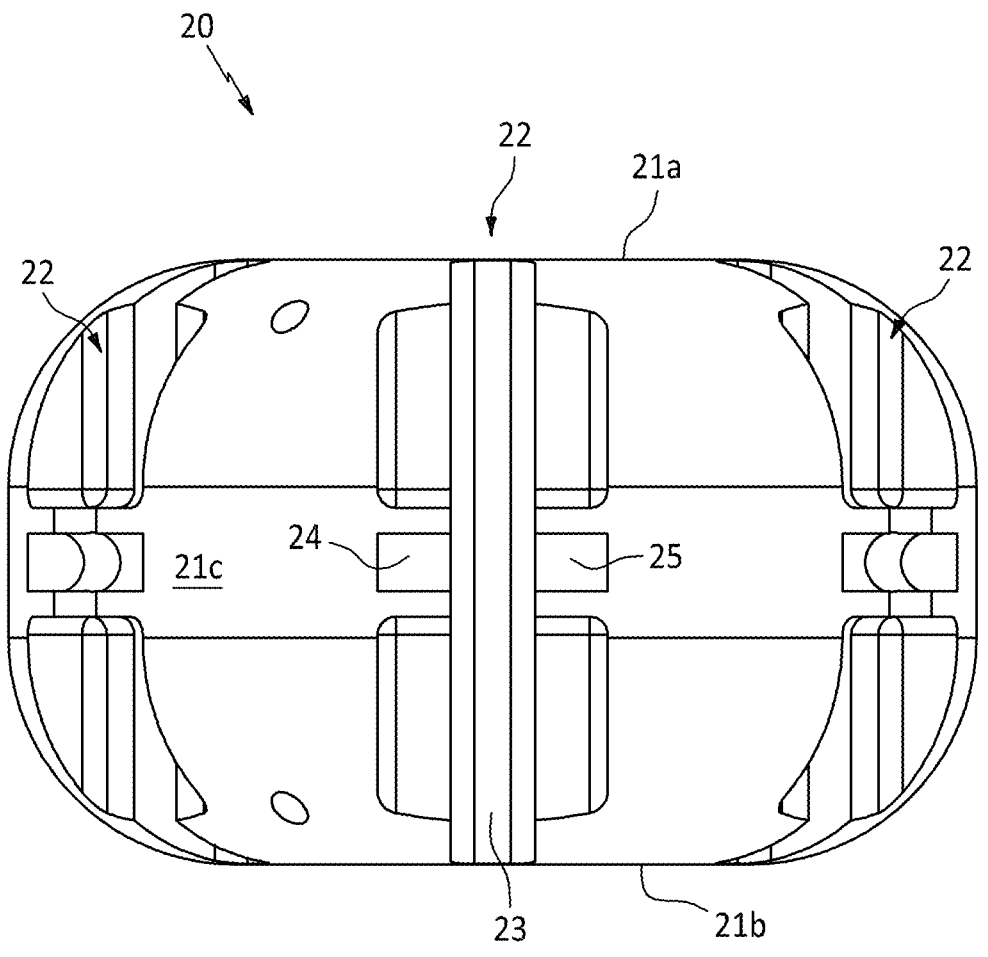
FIG. 2B is a side view of the main body of the pipe float device, in accordance with one embodiment of the invention.
Figure 3:
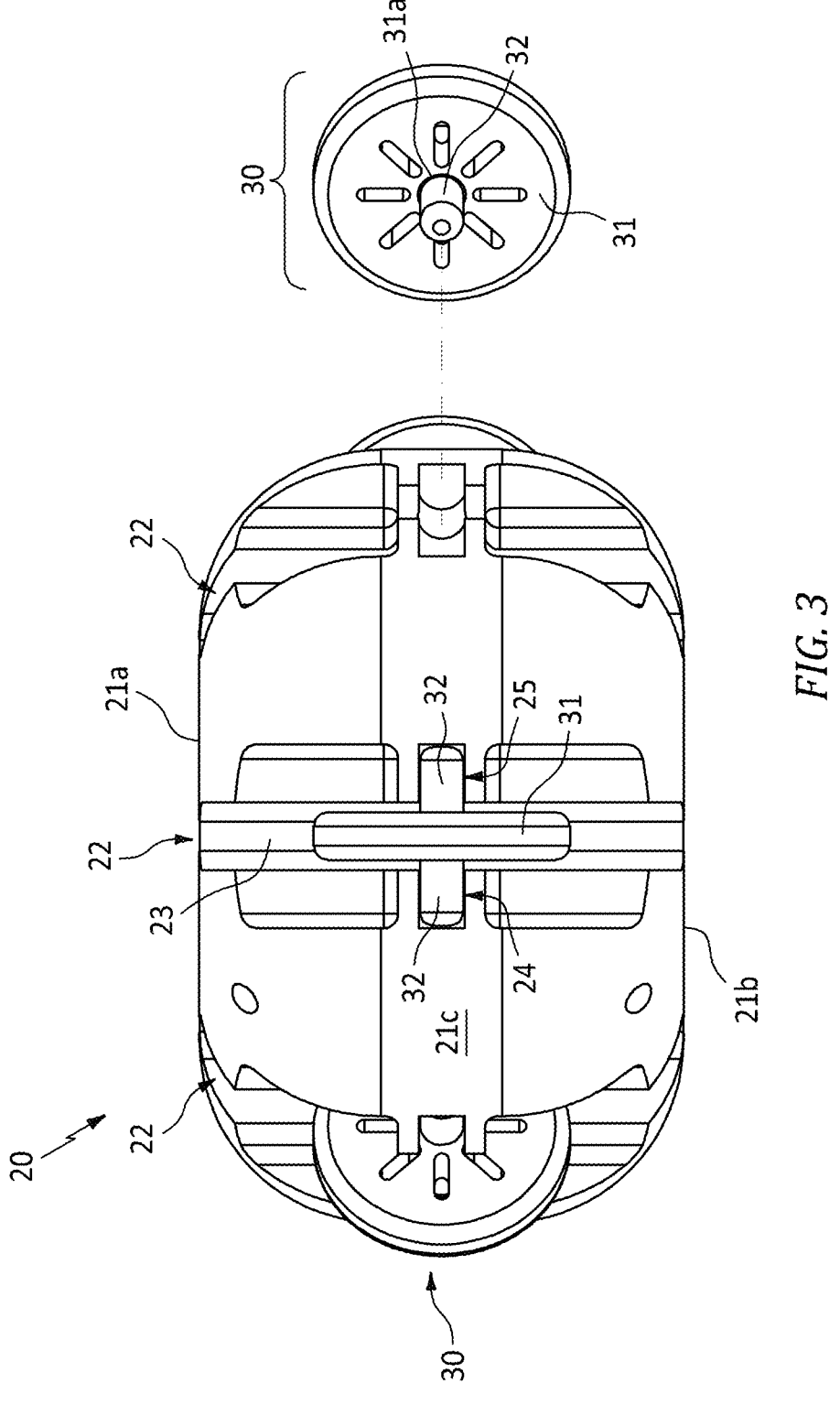
FIG. 3 is a side view of the main body and wheel assembly of the pipe float device, in accordance with one embodiment of the invention.

FIGS. 1-3 illustrate one embodiment of an internal pipe float device 10 that includes a main body 20 having a plurality of wheel assemblies 30 positioned thereon. In the preferred embodiment, the main body 20 can include a generally cylindrical or puck-shaped member having a top surface 21*a*, a bottom surface 21*b*, and an outside edge 21*c* that define a hollow airtight interior space.

In the preferred embodiment, the main body can be constructed from a blow molding process utilizing light-weight and buoyant thermoplastic. Such a material and process is preferred, as this ensures the interior space will remain airtight, thus increasing the overall buoyance of the device. Of course, other embodiments are contemplated wherein different materials and/or different manufacturing processes are also contemplated. For example, other embodiments are contemplated wherein the main body is constructed from or filled with another buoyant material such as polystyrene, EPS or other such materials, for example.

In one embodiment, a plurality of generally U-shaped notches 22 can be provided along the outside edge 21*c* of the main body. Each of the notches can extend inward toward the center of the main body and can function to receive and connect a wheel assembly 30.

In one embodiment, each of the notches can include a vertically oriented central channel 23 extending between the top and bottom surfaces 21*a* and 21*b*, respectively, and a pair of horizontally oriented side channels 24 and 25 that are positioned along the sides of the central channel.

As shown at FIG. 3, each of the wheel assemblies 30 can include a wheel 31 having an axle 32 extending perpendicularly outward from the wheels central opening 31*a*. Each assembly can be positioned such that both ends of the axle 32 can be secured within the side channels 24 and 25 of a notch 22 along the main body. When so positioned, the wheel 31 will be partially located within the central channel 23 and the opposite portion of the wheel will extend slightly (e.g., 5-10 mm) out from the side surface 21*c* of the main body. Such an orientation allows the wheel to rotate freely without making contact with the main body.

Although described above with regard to the wheel assembly engaging channels within the device notches, this is but one possible means for connecting the wheel assemblies to the main body. To this end, other embodiments are contemplated wherein one or more of the specified and illustrated channels are not provided, and/or wherein the wheel assemblies are connected to the main body utilizing connectors such as friction mounted C-clamps or other such devices, for example.

Although illustrated with regard to a separate wheel and axle combination, those of skill in the art will recognize that other types of rotational components and/or manufacturing processes are also contemplated. To this end, the wheel and axle assembly may also be constructed as a single integrated unit, and/or may include optional bearings for reducing drag, for example. In either instance, each of the wheels and axles will preferably be constructed from a lightweight and buoyant material such as plastic, for example, so as to add to the overall buoyancy of the device 10.

Figure 4:
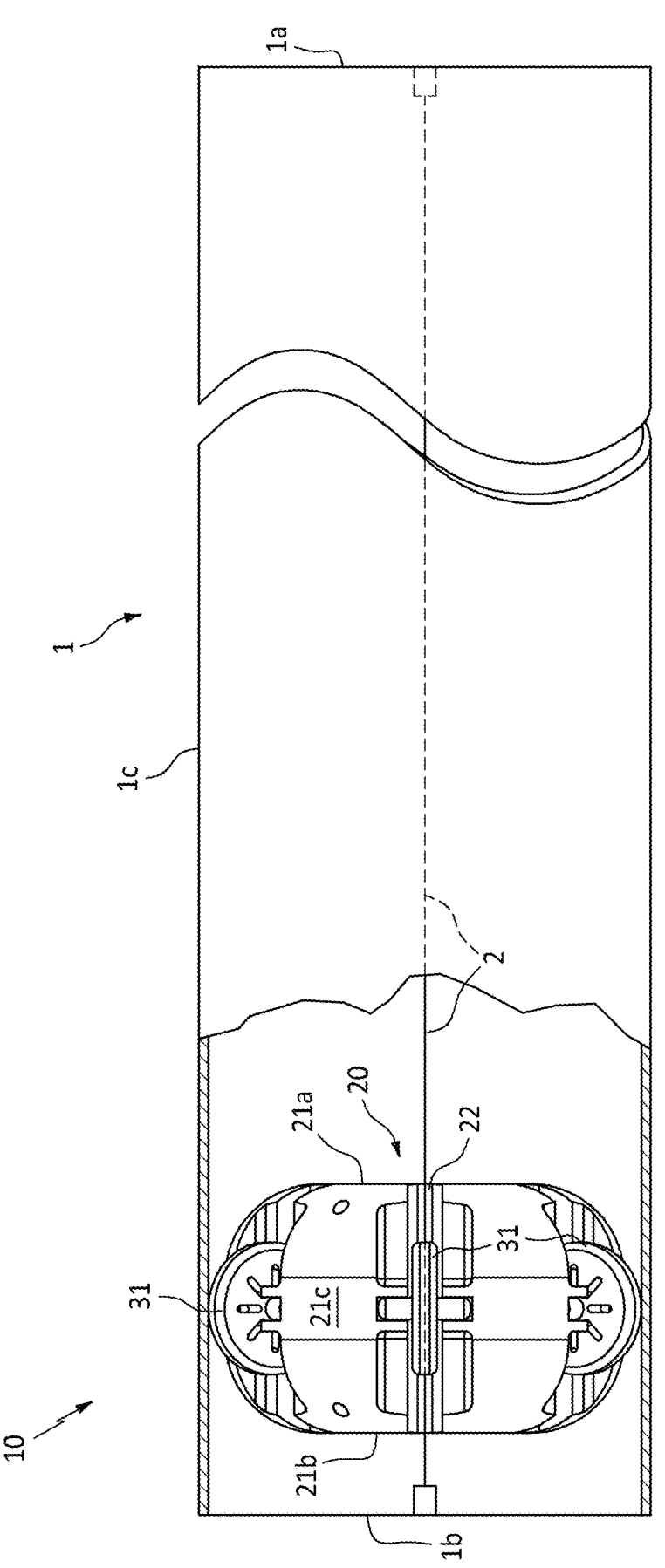
FIG. 4 is a side view of the pipe float device in operation, in accordance with one embodiment of the invention.
Figure 5:
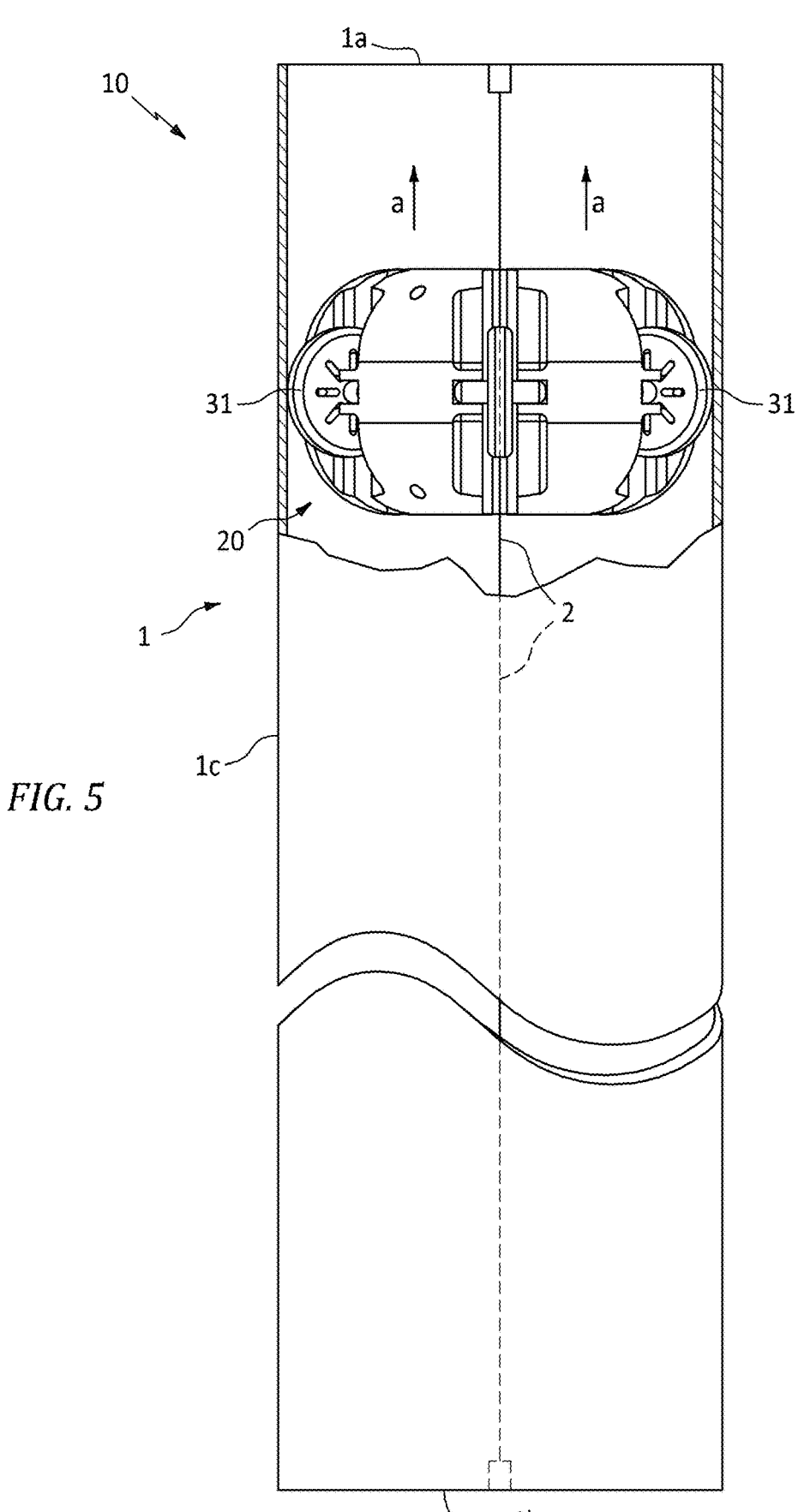
FIG. 5 is another side view of the pipe float device in operation, in accordance with one embodiment of the invention.

As shown best at FIGS. 4 and 5, the device 10 is designed to operate within an elongated pipe 1 that is filled with a liquid such as water, for example. The device 10 is positioned within the pipe such that the top surface 21*a* and bottom surface 21*b* of the main body 20 are serially aligned with the first end 1*a* and second end 1*b* of the pipe, respectively. When so aligned, the outside edge 21*c* and each of the wheels 31 will be positioned adjacent to the pipe sidewalls 1*c*.

In one embodiment, one or more guide wires 2 can be positioned within the pipe so as to extend between both ends 1*a* and 1*b*. When so provided, each wire can be individually positioned through one of the notches on the device 10 so as to rest within the central channel 23 of that notch behind the wheel 31. The guidewire(s) can function to prevent the device 10 from rotating or pivoting within the pipe when traveling between the first and second ends.

The main body 20 of each device 10 will ideally be constructed to include an outside diameter that is comple-mentary to, and/or slightly less than the inside diameter of a specific pipe. Such a feature is important to provide each device with the largest possible interior air-filled space to ensure each device is as buoyant as possible without causing the wheel assemblies 30 to be in constant contact with the sidewall 1*c* of the pipe.

To this end, tests have proven the best results occur when the outside diameter (OD) of the main body 20 is between about .25 and .5 inches less than the inside diameter (ID) of the pipe 1. For example, a device 10 constructed for use with a 4″ ID pipe will include a main body 20 having an OD of between about 3.5″ and 3.75″. Of course, other embodi-ments are contemplated wherein different dimensions are utilized.

In operation, when the pipe 1 is rotated from a horizontal orientation to a vertical orientation, the buoyant nature of the device 10 will cause it to rise through the liquid filled pipe toward the upper end as shown by arrow a. As the device travels, the guide wire 2 will prevent the device from rotating, and the wheels 31 extending slightly out from the side of the main body 20 only periodically make contact with the sidewalls of the pipe. When this occurs, each wheel will rotate to allow the device to continue traveling along the length of the pipe with minimal drag or interruption. Move-ment of the device will be repeated each time the pipe is rotated.

Although illustrated with regard to a single device located within a single pipe, this is but one intended and possible use. To this end, other embodiments are contemplated wherein multiple devices are independently or collectively linked together and positioned within a single pipe or pipe assembly and function to move between the pipe(s) as they transition between horizontal and vertical orientations. Additionally, although illustrated as including six-wheel assemblies, other embodiments having more or less assem-blies are also contemplated.

As to a further description of the manner and use of the present invention, the same should be apparent from the above description. Accordingly, no further discussion relat-ing to the manner of usage and operation will be provided.

As described herein, one or more elements of the device can be secured together utilizing any number of known attachment means such as, for example, screws, glue, com-pression fittings and welds, among others. Moreover, although the above embodiments have been described as including separate individual elements, the inventive con-cepts disclosed herein are not so limiting. To this end, one of skill in the art will recognize that one or more individually identified elements may be formed together as one or more continuous elements, either through manufacturing pro-cesses, such as welding, casting, or molding, or through the use of a singular piece of material milled or machined with the aforementioned components forming identifiable sec-tions thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device for traveling within a pipe, said device comprising:

a main body having a top surface, a bottom surface, a side surface and a hollow interior space;

a plurality of notches that are disposed along the side surface of the main body, each of the plurality of notches including a central channel extending between the top surface and the bottom surface, and at least one side channel that is positioned perpendicular to the central channel; and a plurality of wheel assemblies that are connected to the plurality of notches, each of the plurality of wheel assemblies including a wheel and an axle, wherein the main body is constructed from a buoyant material, and is configured to be positioned within a liquid filled pipe, wherein the axle of each of the wheel assemblies is positioned within the at least one side channel of one of the plurality of notches, and wherein the wheel of each of the wheel assemblies is positioned partially within the central channel of one of the plurality of notches, and wherein at least one of the plurality of notches includes a central channel that is configured to receive a guide wire that is positioned between an inside wall of the central channel and the wheel of the wheel assembly connected to the at least one notch.

2. The device of claim 1, wherein the wheel of each of the plurality of wheel assemblies extends partially outward from the side surface of the main body.

3. The device of claim 1, wherein the wheel of each of the plurality of wheel assemblies extends outward a maximum of between 5 millimeters and 10 millimeters from the side surface of the main body.

4. The device of claim 3, wherein an outside dimension of the main body and plurality of wheel assemblies is complementary to an inside dimension of the pipe.

5. The device of claim 1, wherein each of the plurality of wheel assemblies are buoyant.

6. The device of claim 1, wherein the main body is configured to float within the liquid filled pipe.

7. The device of claim 6, wherein the pipe is configured to be rotated, and the main body is configured to automatically move from a first end of the liquid filled pipe to a second end of the liquid filled pipe when the second end of the liquid filled pipe is rotated to a higher elevation than the first end of the liquid filled pipe.

8. The device of claim 1, wherein the main body includes a cylindrical-shaped member having a shape and size that is complementary to a cross dimensional shape and size of an inside surface of the pipe.

9. The device of claim 1, wherein the wheel and axle of each of the plurality of wheel assemblies are discrete components that are removably connected together.

10. The device of claim 1, wherein the wheel and axle of each of the plurality of wheel assemblies include a unitary construction.

* * * * *